US012668051B2

(12) United States Patent　　(10) Patent No.:　US 12,668,051 B2

Fernandez et al.　　(45) Date of Patent:　*Jun. 30, 2026

(54) METHOD FOR REPAIRING DELAMINATION AND MOISTURE BY HEAT, PRESSURE AND ADHESIVE

(71) Applicants: Rangel Fernandez, Doral, FL (US); Maria Andrea Fernandez, Doral, FL (US)

(72) Inventors: Rangel Fernandez, Doral, FL (US); Maria Andrea Fernandez, Doral, FL (US)

( * ) Notice: Subject to any disclaimer, the term of this patent is extended or adjusted under 35 U.S.C. 154(b) by 107 days.

This patent is subject to a terminal disclaimer.

(21) Appl. No.: 18/595,172

(22) Filed: Mar. 4, 2024

(65) Prior Publication Data

US 2024/0198652 A1　　Jun. 20, 2024

Related U.S. Application Data

(63) Continuation-in-part of application No. 17/361,024, filed on Jun. 28, 2021, now Pat. No. 11,919,277, which is a continuation-in-part of application No. 16/536,001, filed on Aug. 8, 2019, now Pat. No. 11,046,461.

(Continued)

(51) Int. Cl.
| | |
|---|---|
| *B32B 43/00* | (2006.01) |
| *B29C 73/12* | (2006.01) |
| *B32B 17/10* | (2006.01) |
| *B64D 15/12* | (2006.01) |
| *B64F 5/40* | (2017.01) |

(52) U.S. Cl.
CPC .............. *B32B 43/00* (2013.01); *B29C 73/12* (2013.01); *B32B 17/10963* (2013.01); *B64D 15/12* (2013.01); *B64F 5/40* (2017.01)

(58) Field of Classification Search
None
See application file for complete search history.

(56) References Cited

U.S. PATENT DOCUMENTS

| | | | | |
|---|---|---|---|---|
| 3,311,517 A | * | 3/1967 | Rankin | ............. B29C 66/81433 |
| | | | | 156/286 |
| 4,396,826 A | * | 8/1983 | Orcutt | .............. B32B 17/10761 |
| | | | | 219/547 |

(Continued)

FOREIGN PATENT DOCUMENTS

WO　　WO-2017102168 A1 *　6/2017　............... H05B 3/86

*Primary Examiner* — Sue A Purvis
(74) *Attorney, Agent, or Firm* — Malloy & Malloy, P.L.; Robert M. Downey

(57) ABSTRACT

A method for repairing window laminates in which two plies have become separated to create a void, and wherein moisture may have entered through an edge of the window laminate and into the void. The method includes the steps of: placing the window laminate in a vacuum bag and inserting the vacuum bag containing the window laminate into an oven or autoclave for a minimum of ten minutes at a minimum temperature of 120 degrees Fahrenheit to remove the moisture between the plies; removing the vacuum bag and window laminate from the oven, and removing the window from the vacuum bag; forcing a needle on a syringe through the edge of the window laminate in the area of the void; and injecting an adhesive in the syringe into the void to fill the void with the adhesive.

7 Claims, 7 Drawing Sheets

Related U.S. Application Data

(60) Provisional application No. 62/715,968, filed on Aug. 8, 2018.

(56) References Cited

U.S. PATENT DOCUMENTS

| | | | | |
|---|---|---|---|---|
| 4,780,162 A | | 10/1988 | Forler et al. | |
| 4,810,583 A | * | 3/1989 | Brown | B32B 17/10018 |
| | | | | 428/447 |
| 5,049,217 A | | 9/1991 | Forler | |
| 9,125,247 B2 | * | 9/2015 | Li | B29C 45/14811 |
| 11,497,087 B2 | * | 11/2022 | Kong | B60S 1/26 |
| 2025/0222666 A1 | * | 7/2025 | Shen | B29C 73/30 |

* cited by examiner

METHOD FOR REPAIRING DELAMINATION AND MOISTURE BY HEAT, PRESSURE AND ADHESIVE

This non-provisional patent application is a Continuation-In-Part of co-pending non-provisional patent application Ser. No. 17/361,024 filed on Jun. 28, 2021, which is a Continuation-In-Part of non-provisional patent application Ser. No. 16/536,001 filed on Aug. 8, 2019, now U.S. Pat. No. 11,046,461, which is based on provisional patent application Ser. No. 62/715,968 filed on Aug. 8, 2018.

BACKGROUND OF THE INVENTION

Field of the Invention

The invention relates to a method for repairing a delaminated transparent laminate window structure in which two plies of the laminate have been delaminated and or wherein moisture has entered through an edge of the window laminate structure.

Discussion of the Related Art

Window laminates, and particularly aircraft window laminates, typically comprise two to five plies of glass and/or acrylic material which are bound together by interposed polyvinyl adhesive plies. One disadvantage of window laminates of this nature is their tendency to delaminate under certain conditions or after a certain length of time. Upon delamination, the desired characteristics of the laminate (strength, durability, light transmittance characteristics, etc.) are substantially and adversely effected. Further, once this delamination occurs, the delamination spreads rather rapidly throughout the entire window laminate structure. A further problem occurs when moisture enters through the edge of the window laminate structure at the areas of delamination and into the void created by delamination of the two plies. Naturally, it is undesirable to have moisture between plies in a window laminate structure, as this will result in fogging and severely diminished transparency of the window, as well as a degradation of the structural integrity of the window laminate structure. Additionally, it may be necessary to replace failed (i.e., broken) temperature sensors and/or failed heating elements/wires that are embedded within an interlayer of the window laminate structure.

Methods for repairing delamination of aircraft window laminate structures are disclosed in U.S. Pat. No. 4,780,162 to Forler et al. and U.S. Pat. No. 5,049,217 to Forler, the contents of which are incorporated herein by reference.

SUMMARY OF THE INVENTION

The present invention is directed to a method for repairing a delaminated window structure in which two plies of the laminate window structure have been delaminated and/or wherein moisture has entered through an edge of the window laminate structure causing the window to become unfit for use. The method of the present invention can be used to repair laminate window structures in a variety of fields including, but not limited to, aircraft windows, bullet resistant windows (e.g., automobile windows, armored trucks, etc.), and impact resistant windows for architectural use. An aircraft window laminate structure typically includes an outermost nonstructural glass ply and an innermost nonstructural glass ply. A central structural glass ply or panel is sandwiched between the outermost and innermost glass plies and a layer (i.e., film) of polyvinyl butyral (PVB) is laminated between the glass plies. Sometimes, this PVB layer breaks down and causes partial delamination between the PVB layer and the glass plies, such as the outermost glass ply and the central structural glass ply. The present invention provides for a method of repairing the areas of delamination.

The method includes placing the window laminate in a vacuum bag and inserting it into an oven or autoclave for a specific ramp up/hold and ramp down, depending on the severity of the delamination or moisture presented.

Subsequently, a syringe is filled with adhesive. The syringe is affixed to a hypodermic needle and the needle is forced into the void or edge of aircraft window laminate at the delaminated area. The adhesive is injected into the delaminated area to fill the void between plies and prevent moisture or delamination from returning.

After an inspection, typically a visual inspection, if the delaminated area has not been fully repaired by heating in the oven or autoclave or by injection of the adhesive into the void between the plies, then the outermost glass ply and/or the innermost glass ply are removed and the damaged or defective PVB layer is removed and a new PVB film layer is replaced. Additionally, a broken temperature sensor and/or heating elements/wires embedded in an interlayer can be replaced. Subsequently, the removed outermost or innermost glass ply is then replaced and fixed in sealed attachment to complete the repaired aircraft window laminate structure.

OBJECTS AND ADVANTAGES OF THE PRESENT INVENTION

Considering the forgoing, it is a primary object of the present invention to provide a method for repairing window laminate structures which can be performed at a cost substantially less than the original cost of the window laminate structure.

It is a further object of the present invention to provide a method for effectively removing moisture from within voids created by delamination of an aircraft window laminate structure.

It is yet a further object of the present invention to provide a method for effectively removing moisture from within voids created by delamination of a window laminate structure and for repairing delaminated areas of a window laminate structure including aircraft windows, bullet resistant windows and architectural impact resistant windows.

These and other objects and advantages of the present invention are more readily apparent with reference to the following detailed description taken in conjunction with the accompanying drawings.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENT

Figure 1:
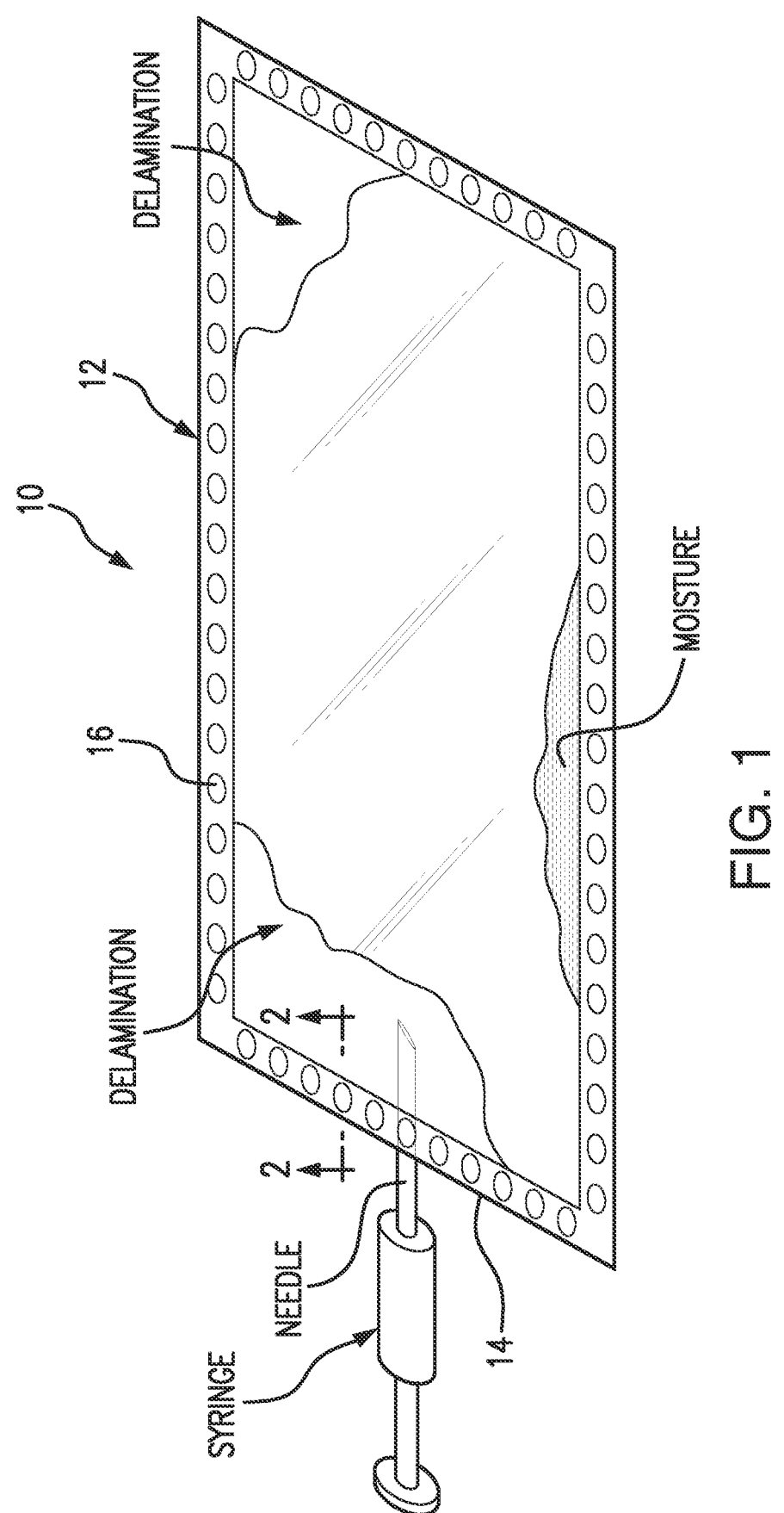
FIG. 1 is a perspective view of an aircraft window illustrating the manner in which the syringe and hypodermic needle is inserted through the seal member into the void of the plies of the laminate which have become separated.

Referring to FIG. 1, a typical aircraft window 10 comprises a transparent laminate structure 12 having several glass and/or acrylic plies adhered together by means of interposed adhesive plies. A frame structure 16 is secured about a perimeter of the window 12 to secure the laminate plies. In particular, the frame structure holds a peripheral edge 14 of the two or more plies of the window laminate structure 12 tightly together.

As noted above, one particular problem encountered with window laminates, such as the type shown in FIG. 1, is the tendency of the two or more plies to delaminate. Upon delamination, voids are created between the two or more plies. Sometimes, moisture can enter through the edge 14 of the window laminate structure 12 to fill the voids created by delamination.

The present invention provides a method for removing moisture within the voids of delaminated window laminate structures and further a method for repairing the delaminated areas. The method for removing moisture includes the steps of: placing the window laminate structure in a vacuum bag and sealing the vacuum bag closed; inserting the vacuum bag containing the window laminate into an oven or autoclave for a minimum of ten minutes at a minimum temperature of 120 degrees Fahrenheit to remove the moisture between the two or more plies of the delaminated aircraft window laminate structure; removing the vacuum bag and the window laminate structure from the oven or autoclave; and removing the window from the vacuum bag. The method further includes the steps of repairing the delaminated areas by forcing a needle on a syringe through the edge 14 of the window laminate structure 12 in the area of delamination and injecting an adhesive in the syringe into the void to fill the void with the adhesive; and removing the needle from the void and from the edge of the window laminate structure.

Figure 2:
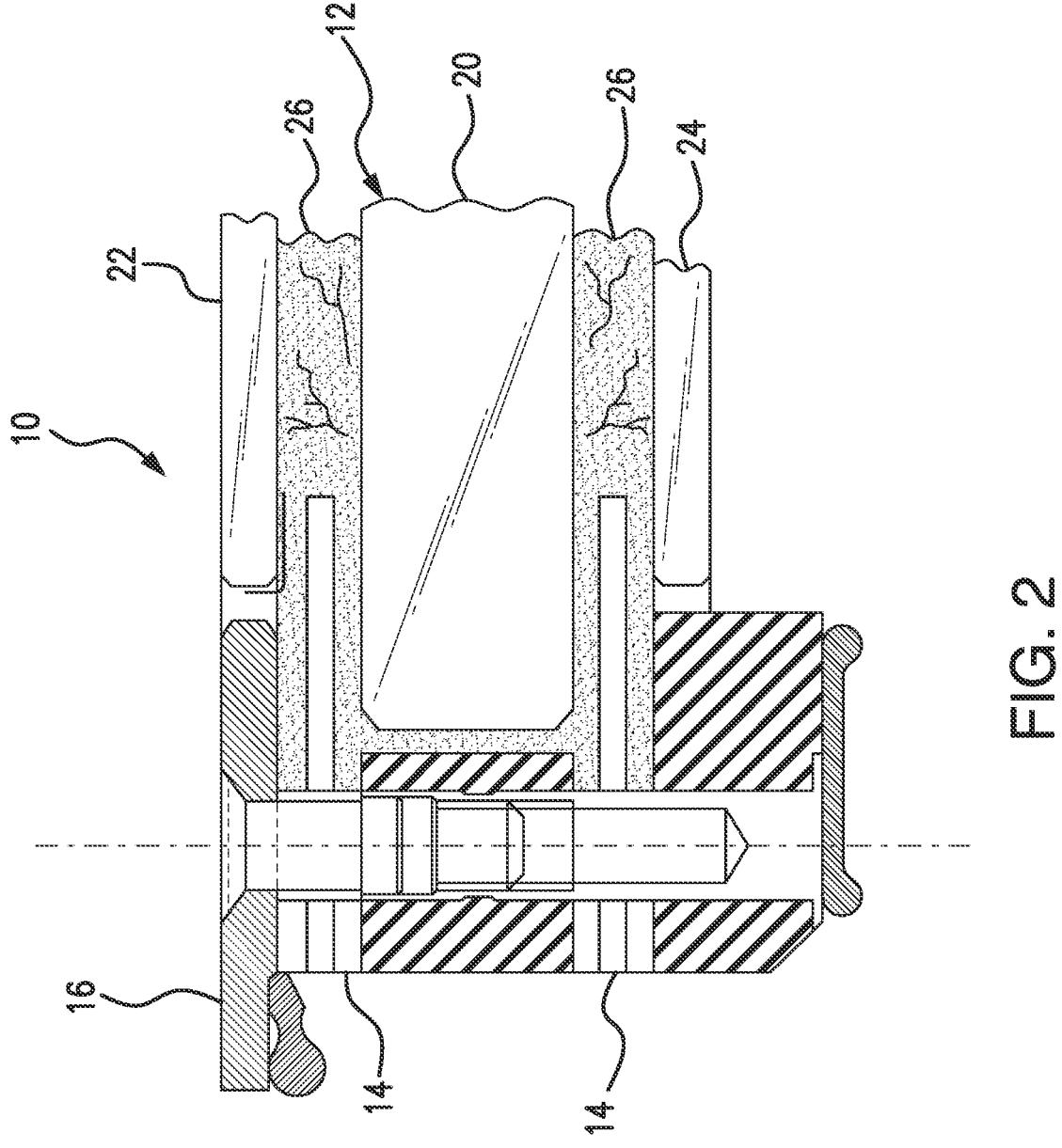
FIG. 2 is an isolated cross-sectional view taken along the plane indicated by the arrows 2-2 in FIG. 1 and illustrating the multiple plies of the laminate structure of the aircraft window including a nonstructural outer glass ply, a center structural glass member and a nonstructural inner glass ply, and wherein a polyvinyl butyral (PVB) layer between the outer ply and the central structural glass member and between the inner glass ply and the central structural glass member is shown to be defective.
Figure 3:
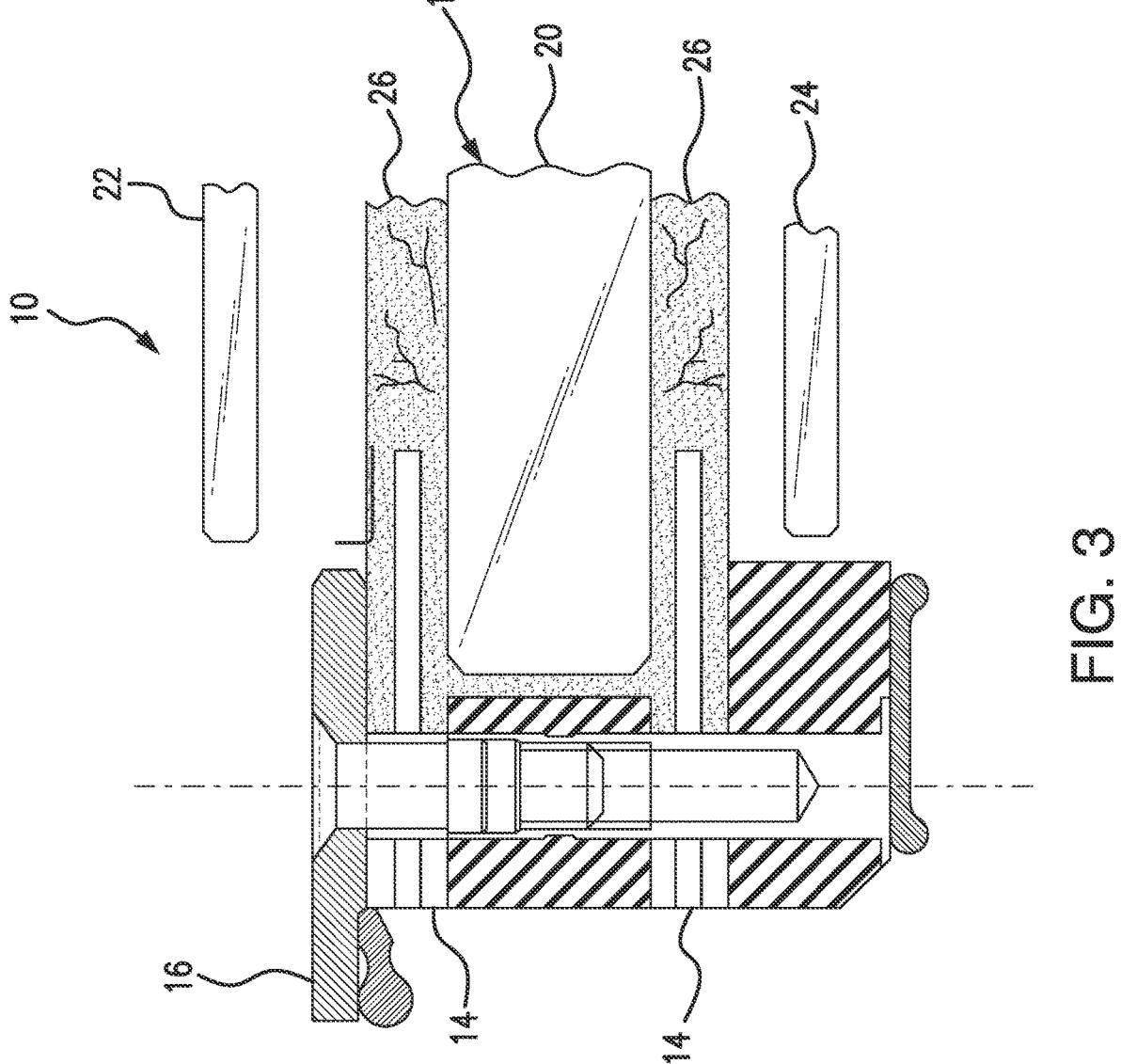
FIG. 3 is an isolated cross-sectional view similar to FIG. 2 and showing the outer glass ply and inner glass ply removed to allow repair of the damaged PVB plies.
Figure 4:
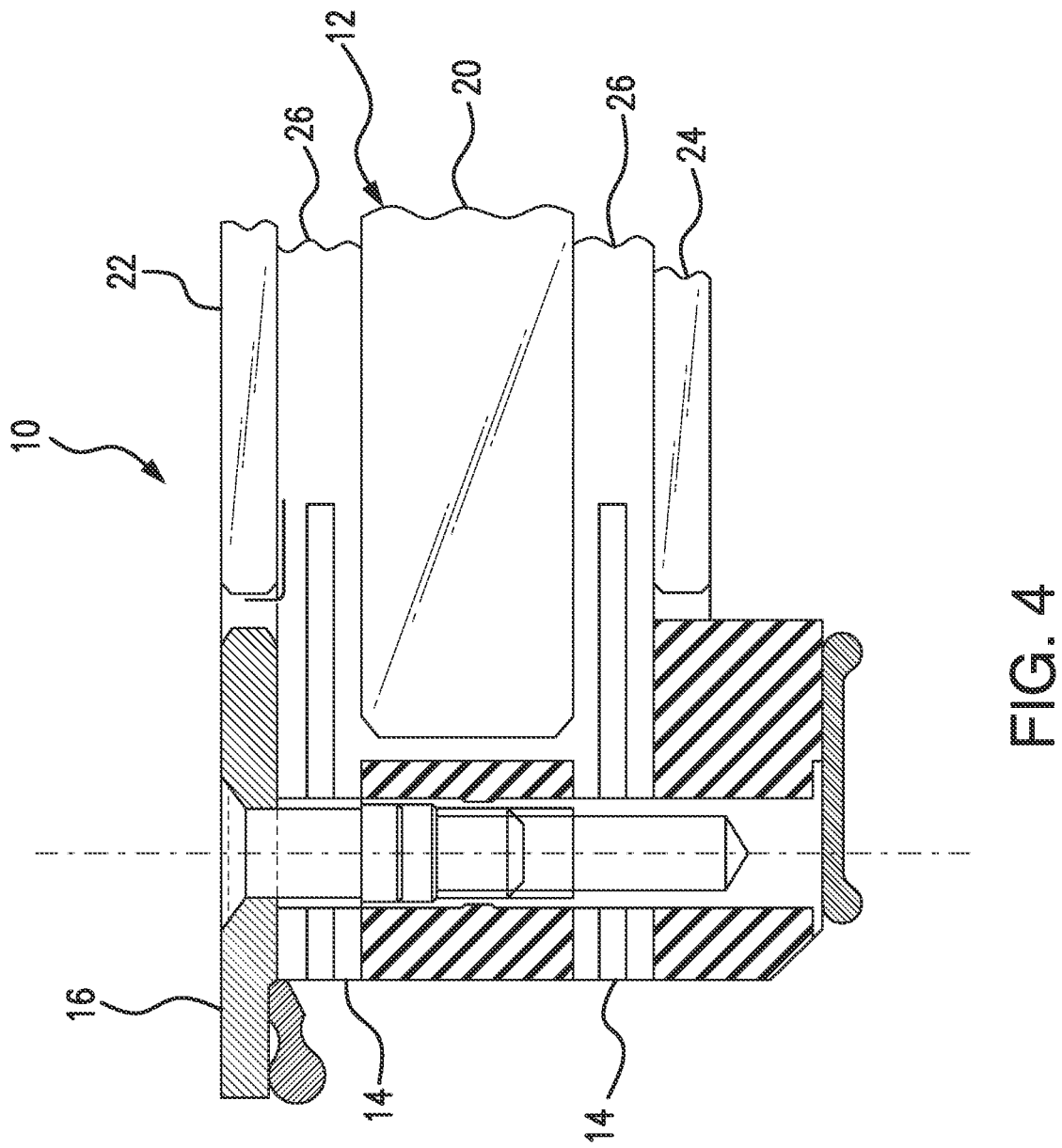
FIG. 4 is a cross-sectional view similar to FIG. 2 and wherein the PVB layers have been repaired and the outer and inner glass plies replaced.

Referring to FIGS. 2-4, an isolated cross-section of the transparent laminate structure of the aircraft window 10 of FIG. 1 is shown. The laminate structure of the aircraft window 10 includes the several glass and/or acrylic plies including a central structural glass ply 20, a nonstructural deicing outer glass ply 22 and a nonstructural defogging inner glass ply 24. The glass plies 20, 22 and 24 are bonded together by adhesive layers 26. The adhesive layers are typically formed of a polyvinyl butyral (PVB) material.

In FIG. 2, the PVB layer is shown to be damaged. According to the method of the present invention, following the step of injecting the adhesive by syringe into the void in the areas of delamination, if, after inspection, the delamination is not fully repaired by heating in the oven/autoclave and the injection of adhesive, and/or the PVB plies are simply damaged, then it is necessary to remove the outer glass ply 22 and/or the inner glass ply 24 in order to repair the damaged adhesive ply 26. Once the outer and/or inner glass plies are removed, the damaged PVB adhesive layer is removed and replaced. Typically, the PVB layer is removed by application of heat that is sufficient to cause the PVB layer to soften and separate from the glass plies.

FIG. 3 shows the outer and inner glass plies 22, 24 removed to allow removal and replacement of the adhesive PVB plies 26. Once removed, new PVB adhesive ply is installed and the outer and inner glass plies 22 and 24 are replaced, as shown in FIG. 4, thereby fully repairing the previously delaminated laminate structure of the aircraft window 10.

Figures 5, 5A:
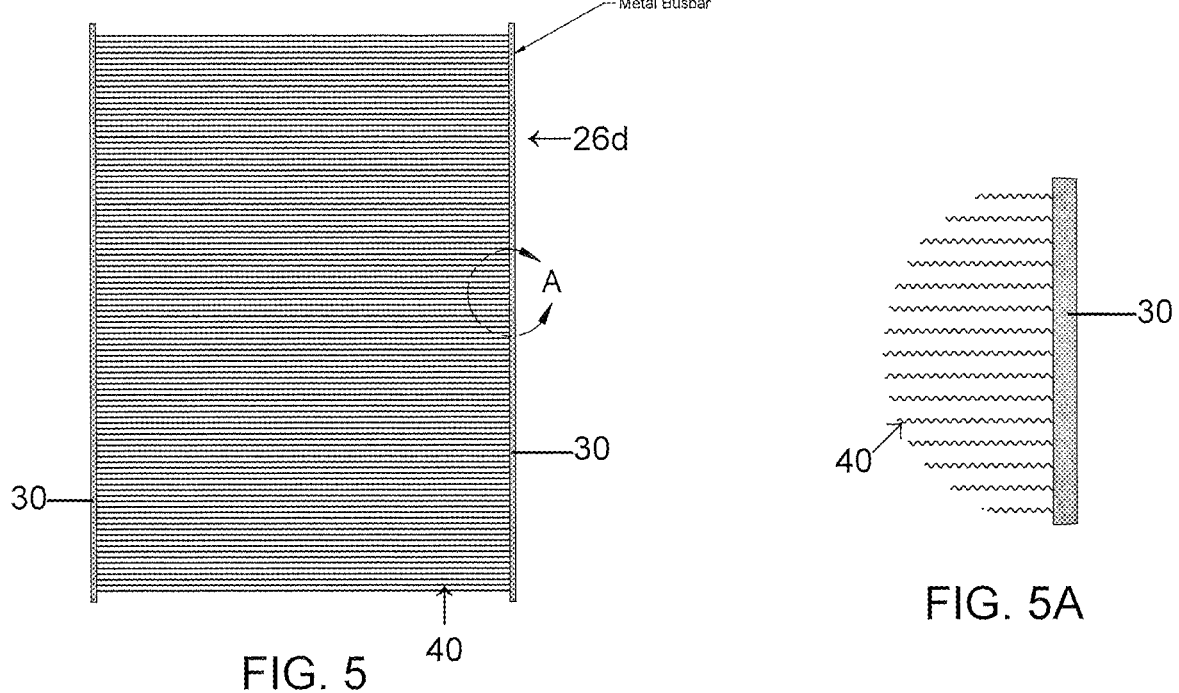
FIG. 5 is a top plan view of an interlayer with heating wires connecting to metal busbar on opposite sides of the heating wires.
FIG. 5A is an isolated view taken from the area indicated as A in FIG. 5 and showing the heating wires connecting to a busbar on one side of the interlayer.
Figure 7:
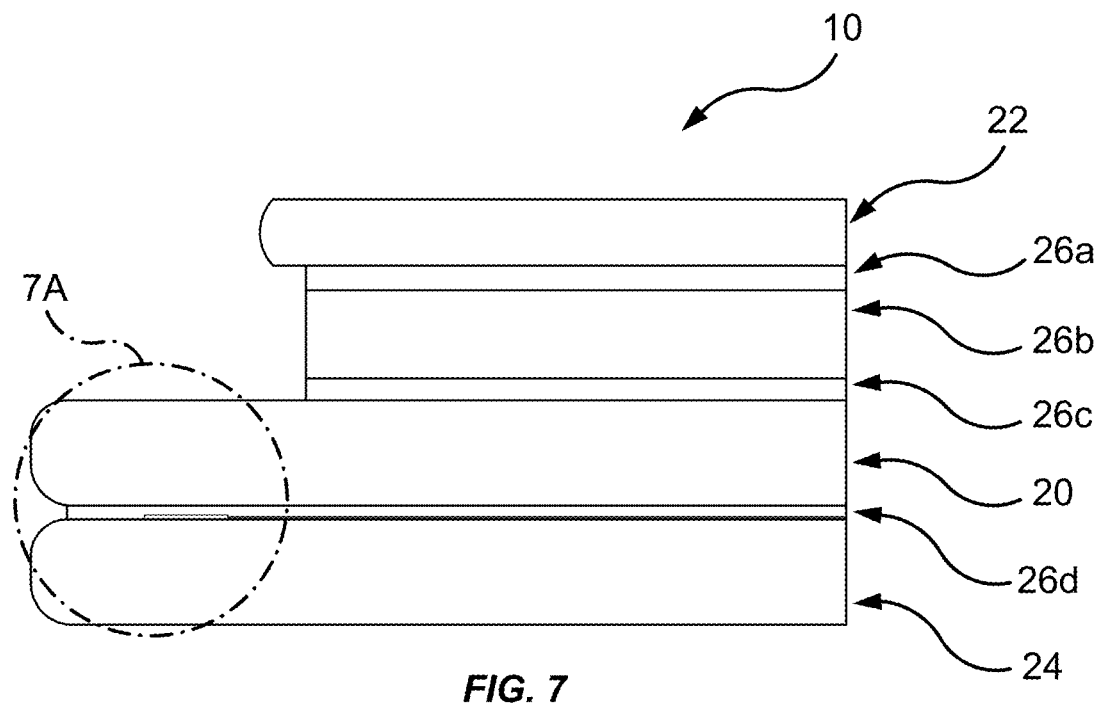
FIG. 7 is an isolated cross-sectional view showing the multiple layers of the window laminate structure according to the present invention.
Figure 7A:
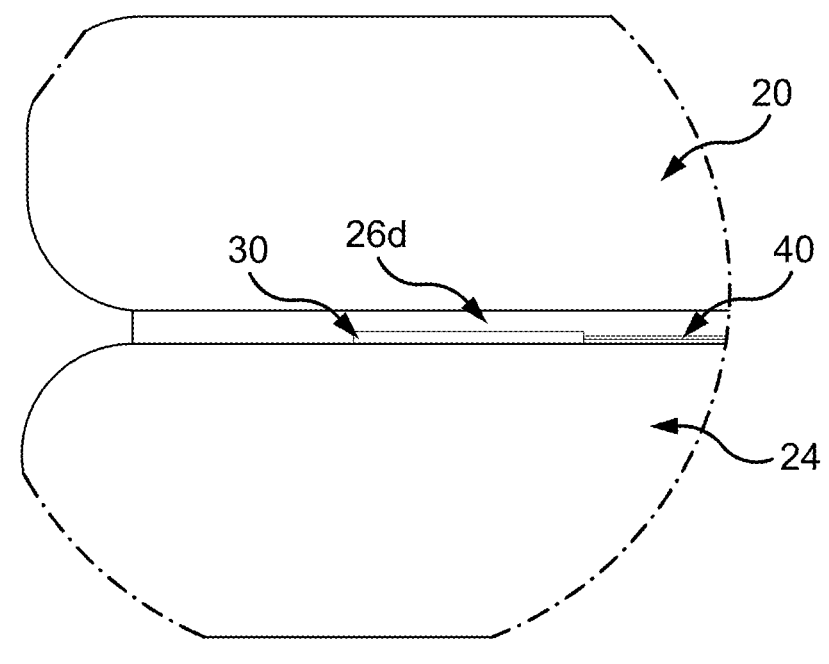
FIG. 7A is an isolated cross-sectional view taken from the area indicated as A in FIG. 7.

Referring to FIGS. 7 and 7A, one example of an aircraft window 10 is shown and includes the central structural glass ply 20, the outer glass ply 22 and the inner glass ply 24. Interlayers 26a, 26b and 26c are sandwiched between the central structural glass ply 20 and the outer nonstructural glass ply 22. Additionally, an interlayer 26d is sandwiched between the central structural glass ply 20 and the nonstructural inner glass ply 24. In this particular example, the interlayer 26d includes wire heaters 40 embedded within the interlayer 26d for heating the window for deicing and defogging purposes. During the repair of the aircraft window laminate structure it may be necessary or desirable to replace the wire heaters 40 along with the interlayer 26d. In some instances, the wire heaters may be damaged and no longer functional, and therefore it is necessary to replace the wire heaters 40. FIGS. 5 and 5A show the wire heaters 40 that connect between opposite busbar 30 on opposite ends of the wire heaters. In operation, the wire heaters are heated by running an electric current through the busbars which in turn is directed through the wire heaters.

To repair the nonfunctional or damaged resistive wire heaters in the aircraft window laminate structure, the glass ply (i.e., outer glass ply 22 or inner glass ply 24) which is adjacent to the wire heaters is removed. In the example shown in FIG. 7, the inner glass ply 24 is adjacent to the wire heaters embedded within the interlayer 26d. In this case, the inner glass ply 24 is removed and the nonfunctional or damaged wire heaters 40 which are embedded in the interlayer 26d are also removed along with any interlayer material which the wire heaters 40 are adhered to and/or any damaged interlayer material. A new film of interlayer material that is embedded with functional resistive wire heaters is then placed in the correct position on the aircraft window laminate structure. Any additional interlayer is also added at this point. The wire heater busbar 30 are then soldered to the required power leads, and electricity as per manufacturer specifications is run through the wire heaters to confirm the functionality of the wire heaters. Finally, the removed glass ply 24 is placed back onto the aircraft window laminate structure and adhered through autoclave processing.

Figure 6:
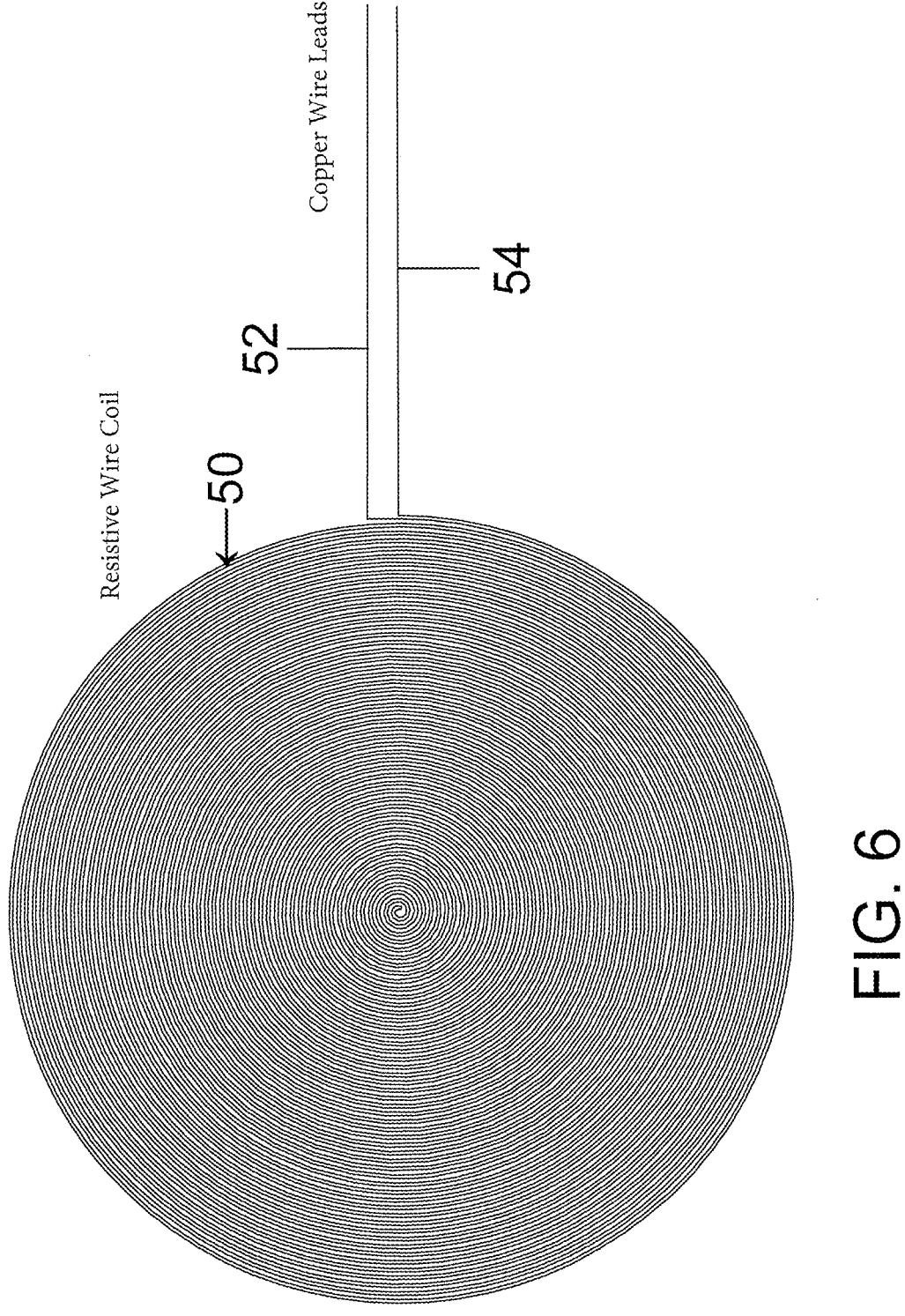
FIG. 6 is a top plan view of a circular wire coil temperature sensor that is replaced with the interlayer with heating elements at the time of repair of the window laminate structure.

When the glass ply adjacent to the wire heaters is removed, it may also be desirable or necessary to replace heat sensors. The present invention provides for an improved heat sensor 50 that is comprised of a series of wound wire in a coil on a flat plane, as shown in FIG. 6. The change of resistance in the wound wire coil 50 can be attributed to a change in temperature and a mathematical formula can be derived to determine temperature based on the resistive value of the sensor 50. The sensing element material, length, diameter of the wire, size, and the number of winds in the coil can be changed to meet certain resistance and rate of change requirements. The circular wire coil heat sensor 50 of the present invention provides several benefits over existing prior art heat sensors used in aircraft window laminate structures. In particular, the circular shape of the wire coil heat sensor 50 of the present invention reduces the amount of sharp turns, and therefore decreases the amount of stress concentration points of the sensing element. Moreover, the circular shape of the wire coil heat sensor 50 provides greater area of coverage for any given perimeter. In replacing the existing heat sensors, the wire coil heat sensor 50 of the present invention is laminated with the interlayer 26d and wire heaters 40 between the central structural glass ply 20 and the inner glass ply 24. Placing the wire coil heat sensor 50 physically near the wire heaters 40 allows for a quick response and measurement time for the temperature of the interlayer 26d/window laminate structure 12. The heat sensor 50 is placed near the perimeter of the heated area of the interlayer 26d according to an area that demonstrates average heating, as determined during testing and manufacturing. The heated area has a normal tolerance for heating, typically ±10% of the desired temperature and every window has its own heat signature. The sensor 50 is placed near the perimeter of the heated area so as not to interfere with pilot vision on a section of the perimeter that represents the heat signature of the window. The term heat signature refers to a unique heat pattern of each particular aircraft window laminate structure.

While the present invention has been shown and described in accordance with a preferred and practical embodiment, it is recognized that departures from the instant disclosure are fully contemplated within the spirit and scope of the present invention which is not to be limited except as defined in the following claims as interpreted under the Doctrine of Equivalents.

What is claimed is:

1. A method for repairing a window laminate which has been delaminated and wherein moisture has entered into a void created by delamination, comprising the steps of:

placing the window laminate into a vacuum bag, sealing the vacuum bag closed and placing the vacuum bag containing the window laminate into an oven or an autoclave for a minimum of ten minutes at a minimum temperature of 120 degrees Fahrenheit to remove moisture between plies of the window laminate;

removing the vacuum bag and the window laminate from the oven or the autoclave; and removing the window laminate from the vacuum bag;

inspecting the window laminate for damage or defects;

removing at least one of an outer nonstructural glass ply or an inner nonstructural glass ply upon determining damage or a defect in an adhesive ply of the window laminate;

removing the damaged or defective adhesive ply;

replacing the damaged or defective adhesive ply with a new adhesive ply;

removing damaged or defective heating wires and busbar and replacing new and functional wire heaters and busbar with the new adhesive ply; and reattaching the removed at least one of the outer nonstructural glass ply or the inner nonstructural glass ply to the window laminate to complete a repair of the window laminate.

2. A method for repairing a window laminate which has been delaminated and wherein moisture has entered into a void created by delamination, comprising the steps of:

placing the window laminate into a vacuum bag, sealing the vacuum bag closed and placing the vacuum bag containing the window laminate into an oven or an autoclave for a minimum of ten minutes at a minimum temperature of 120 degrees Fahrenheit to remove moisture between plies of the window laminate;

removing the vacuum bag and the window laminate from the oven or the autoclave; and removing the window laminate from the vacuum bag;

inspecting the window laminate for damage or defects;

removing at least one of an outer nonstructural glass ply or an inner nonstructural glass ply upon determining damage or a defect in an adhesive ply of the window laminate;

removing the damaged or defective adhesive ply;

replacing the damaged or defective adhesive ply with a new adhesive ply;

removing a damaged or defective heat sensor and replacing the damaged or defective heat sensor with a functional heat sensor; and reattaching the removed at least one of the outer nonstructural glass ply or the inner nonstructural glass ply to the window laminate to complete a repair of the window laminate.

3. The method as recited in claim 2 wherein the replaced functional heat sensor is a circular wire coil heat sensor.

4. The method as recited in claim 3 wherein the wire coil heat sensor comprises a series of wound wire in a coil on a flat plane.

5. A method for repairing a window laminate which has been delaminated and wherein moisture has entered into a void created by delamination, comprising the steps of:

placing the window laminate into a vacuum bag, sealing the vacuum bag closed and placing the vacuum bag containing the window laminate into an oven or an autoclave for a minimum of ten minutes at a minimum temperature of 120 degrees Fahrenheit to remove moisture between plies of the window laminate;

removing the vacuum bag and the window laminate from the oven or the autoclave; and removing the window laminate from the vacuum bag;

inspecting the window laminate for damage or defects;

removing at least one of an outer nonstructural glass ply or an inner nonstructural glass ply upon determining damage or a defect in an adhesive ply of the window laminate;

removing the damaged or defective adhesive ply;

replacing the damaged or defective adhesive ply with a new adhesive ply;

removing damaged or defective heating wires and busbar and replacing new and functional wire heaters and busbar with the new adhesive ply;

removing a damaged or defective heat sensor and replacing the damaged or defective heat sensor with a functional heat sensor; and reattaching the removed at least one of the outer non-structural glass ply or the inner nonstructural glass ply to the window laminate to complete a repair of the window laminate.

6. The method as recited in claim 5 wherein the replaced functional heat sensor is a circular wire coil heat sensor.

7. The method as recited in claim 6 wherein the wire coil heat sensor comprises a series of wound wire in a coil on a flat plane.

* * * * *